United States Patent
Rush et al.

(10) Patent No.: US 9,957,727 B1
(45) Date of Patent: May 1, 2018

(54) FORM LINER FOR FABRICATING NON-LINEAR SHAPES

(71) Applicants: Ryan L. Rush, Cockeysville, MD (US); Leslie R. Rush, Jr., Cockeysville, MD (US)

(72) Inventors: Ryan L. Rush, Cockeysville, MD (US); Leslie R. Rush, Jr., Cockeysville, MD (US)

(*) Notice: Subject to any disclaimer, the term of this patent is extended or adjusted under 35 U.S.C. 154(b) by 0 days. days.

(21) Appl. No.: 15/590,297

(22) Filed: May 9, 2017

(51) Int. Cl.
| | |
|---|---|
| E04G 9/05 | (2006.01) |
| E04G 9/10 | (2006.01) |
| B32B 5/18 | (2006.01) |
| B32B 27/06 | (2006.01) |

(52) U.S. Cl.
CPC ............... E04G 9/05 (2013.01); B32B 5/18 (2013.01); B32B 27/065 (2013.01); E04G 9/10 (2013.01)

(58) Field of Classification Search
CPC .... E04G 9/05; E04G 9/10; B32B 5/18; B32B 27/065
See application file for complete search history.

(56) References Cited

U.S. PATENT DOCUMENTS

| | | | | |
|---|---|---|---|---|
| 3,401,494 A * | 9/1968 | Anderson | ............... | E04C 2/205 52/309.11 |
| 3,922,828 A * | 12/1975 | Patton | ................. | E04C 3/29 52/309.2 |
| 3,979,867 A * | 9/1976 | Sowinski | ............... | E04B 7/225 52/309.11 |
| 4,109,436 A * | 8/1978 | Berloty | ................. | E04C 2/24 52/309.2 |
| 4,333,290 A * | 6/1982 | Koberstein | ........... | E04B 1/7612 52/309.2 |
| 4,480,416 A * | 11/1984 | Judkins | ................. | E04D 3/3602 52/309.7 |
| 4,625,486 A * | 12/1986 | Dickinson | ............... | E04B 1/66 52/404.1 |
| 4,655,013 A * | 4/1987 | Ritland | ................. | E04B 1/14 52/127.9 |
| 5,005,799 A * | 4/1991 | Gallagher | ........... | E04G 21/1841 249/175 |
| 5,465,542 A * | 11/1995 | Terry | ................... | E04B 2/26 52/309.12 |
| 5,815,989 A * | 10/1998 | Bennenk | ............... | E04B 7/08 52/309.11 |
| 6,453,631 B1 * | 9/2002 | Headrick | ............... | B29C 44/12 49/504 |

(Continued)

*Primary Examiner* — Michael Safavi
(74) *Attorney, Agent, or Firm* — H. Jay Spiegel

(57) ABSTRACT

A form is made out of a molded foam devoid of any surrounding rigid wall structure. About the periphery of the form a plurality of spaced elongated slots are formed from top to bottom. Elongated strips of material such as oriented strand board are inserted within the slots and fastened in place. The inventive form consists of a liner placed within an existing contractor form. Fasteners are fastened through the walls of the contractor form into the walls of the inventive form liner and through the elongated strips to thereby fasten the inventive form liner within the existing contractor form. No adhesive is required between the outer surfaces of the inventive form liner and the existing form nor is there any need for any intermediate plywood walls surrounding the inventive form liner.

18 Claims, 4 Drawing Sheets

(56) References Cited

U.S. PATENT DOCUMENTS

| | | | | |
|---|---|---|---|---|
| 6,481,170 | B1* | 11/2002 | Savenok | E04B 1/7629 |
| | | | | 264/45.1 |
| 6,571,523 | B2* | 6/2003 | Chambers | E04B 1/14 |
| | | | | 52/270 |
| 8,827,235 | B1* | 9/2014 | Fisher | E04G 11/08 |
| | | | | 249/35 |
| 2001/0008319 | A1* | 7/2001 | Kistner | E04C 2/044 |
| | | | | 264/135 |
| 2003/0218265 | A1* | 11/2003 | Garcia-Gutierrez | E04G 13/02 |
| | | | | 264/35 |
| 2006/0016150 | A1* | 1/2006 | Fournier | B28B 7/342 |
| | | | | 52/745.17 |
| 2009/0001247 | A1* | 1/2009 | Niu | E04G 13/02 |
| | | | | 249/48 |

* cited by examiner

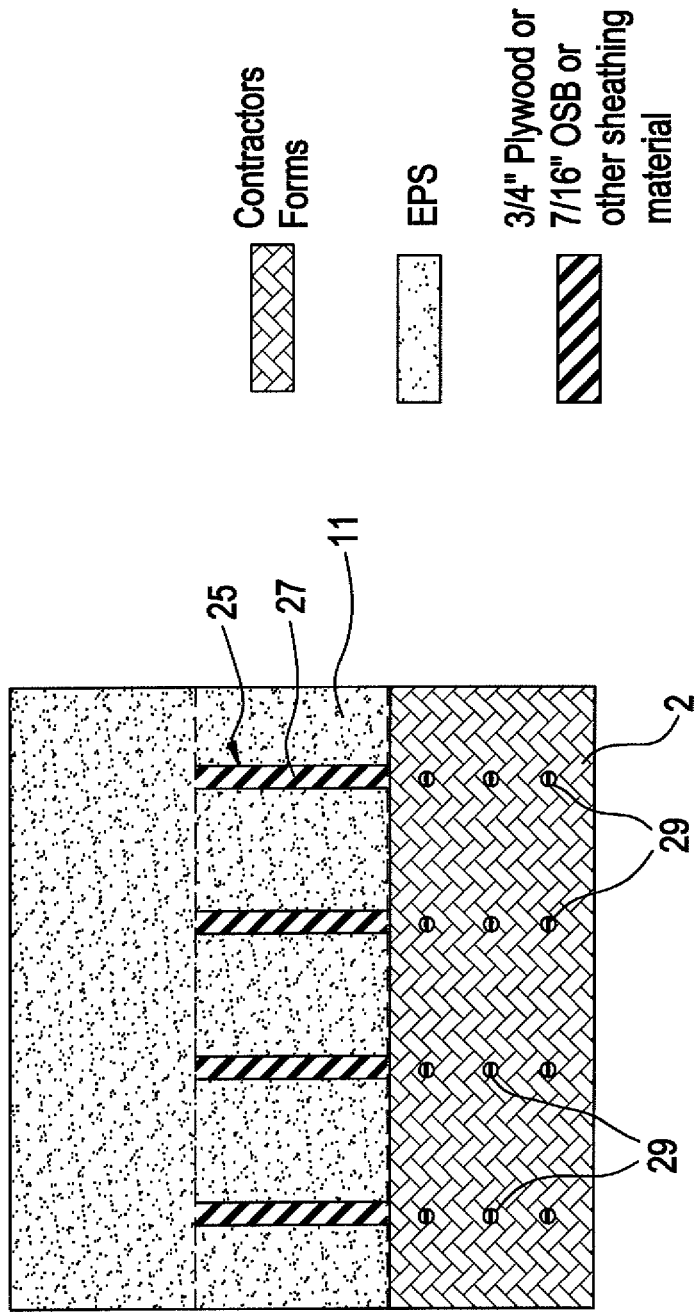

FORM LINER FOR FABRICATING NON-LINEAR SHAPES

BACKGROUND OF THE INVENTION

The present invention relates to an improved form liner for fabricating non-linear shapes. In large construction projects such as in building large concrete supports for bridges, typically, the supports are formed out of reinforced concrete in place at the site of the construction. Concrete bridge supports have some sides and ends that may be linear and others that are arcuate or of other non-linear or complex shapes, depending upon the particular circumstances of the topography, geography, and specific location of the bridge supports. As such, non-standard shaped forms must be created in order to facilitate pouring concrete for the purpose of creating such bridge supports.

In the prior art, it is known to create complex forms to facilitate creation of bridge supports having complex shapes. Such, forms are often made of expanded polystyrene (EPS) or other foam materials. Such forms are fabricated as liners to accommodate to standard linear-sided forms already created by contractors and used over and over again.

With reference to FIG. 1, a typical contractor form is generally designated by the reference numeral 1 and is seen to include an end wall 2 and side walls 3 and 4 that are perpendicular thereto. FIG. 1 is looking down on the form from above. In order to facilitate creation of a bridge support having a non-linear shape, a prior art form liner is made having a periphery 5 typically made of plywood and adhered to an internal form shape 6 with a layer of adhesive 7. The form layer 6 is typically made of a material such as EPS.

As seen in FIG. 1, the form liner generally designated by the reference numeral 8 is configured so that the peripheral walls 5 match with the walls 2, 3 and 4 of the typical contractor form 1. The form liner 8 is removably attached to the form 1 through the use of screws 9 extending through the walls 2, 3 and 4 of the form 1 and into the walls 5 of the form liner 8.

Another way of attaching the form liner 8 to the contractor form 1 is to eliminate the wall 5 and directly adhere the EPS 6 to the form 1 walls 2, 3 and 4 using the adhesive layer 7. In the former case, including the walls 5 in the form liner 8 renders the form liner 8 extremely heavy, cumbersome, and expensive to manufacture. In the latter case, omitting the walls 5 and adhering the EPS foam 6 directly to the inner surfaces of the walls 2, 3 and 4 of the form 1 introduces an additional expense because it becomes labor intensive to remove the form liner 8 from the walls of the contractor form 1, requiring extensive scraping of the adhesive 7 off the inner surfaces of the walls 2, 3 and 4.

It should be understood that the forms 1 and liner 8 are often 20 to 30 feet tall or taller in some cases because they must be tall enough to receive reinforcing rebar and rods as well as all of the concrete necessary to create a bridge support that can be 20 to 30 feet tall or even taller in some cases.

As such, a need has developed for a form liner that reduces the weight of non-linear forms currently used, reduces the expense of their manufacture, and reduces the labor costs of their installation and removal. It is with these requirements in mind that the present invention was developed.

SUMMARY OF THE INVENTION

The present invention relates to an improved form liner for fabricating non-linear shapes. Typically, the shapes are fabricated out of a curable or hardenable material such as concrete. The present invention includes the following interrelated objects, aspects and features:

(1) In a first aspect, the present invention is intended to simplify forms which are employed in molding large objects out of concrete.

(2) In simplifying such forms, reductions in expense, weight and convenience are achieved and installation and removal are enhanced.

(3) In particular, the present invention contemplates a form liner made out of a molded foam such as, for example, EPS, with the form liner being devoid of any surrounding rigid wall structure. Instead, about the periphery of the form liner, after it is formed or cut, a plurality of spaced elongated slots are formed from top to bottom. When the slots are created, elongated strips of material such as oriented strand board (OSB), plywood, or other wood or wood-like substance or steel plate, metal stud, or other metal profile are inserted within the slots and fastened in place by any suitable means such as adhesive or screws.

(4) Once the OSB or other material strips are inserted within the slots and fastened, the inventive form liner is ready for use.

(5) In use, the inventive form liner is placed within the contractor form with the outer surfaces of the inventive form liner being molded or formed to conform to the inner surfaces of the typical contractor form. Screws or other fasteners are fastened through the walls of the contractor form into the walls of the inventive form liner and through the elongated OSB or other material strips to thereby fasten the inventive form liner within the concrete form. No adhesive is required between the outer surfaces of the inventive EPS form liner and associated form nor is there any need for any intermediate plywood walls surrounding the inventive form liner.

(6) With the inventive form liner so installed, reinforcing rebar and rods are inserted within a form consisting of contractor forms combined with the inventive form liner, concrete is poured and allowed to set and the inventive form liner is easily removed by merely removing the fasteners that were inserted from the outside of the contractor form. In this way, an inexpensive but effective way to facilitate molding of non-linear shapes is provided.

As such, it is a first object of the present invention to provide an improved form liner for fabricating non-linear shapes.

It is a further object of the present invention to provide such an improved form liner which is devoid of any rigid surrounding supporting walls.

It is a still further object of the present invention to provide such an improved form liner which includes elongated strips of material such as OSB or metal extrusions located within slots pre-formed within an EPS molded or formed structure.

It is a yet further object of the present invention to provide such an improved form liner in which it may be located within an already fabricated contractor form and removably attached thereto using fasteners extended through the walls of the contractor form, into the walls of the EPS structure and through the OSB strips.

It is a still further object of the present invention to provide such an improved form liner in which no adhesives are required to facilitate attachment of the inventive form liner to a contractor form.

These and other objects, aspects and features of the present invention will be better understood from the following detailed description of the preferred embodiment when read in conjunction with the appended drawing figures.

BRIEF DESCRIPTION OF THE DRAWINGS

FIG. 4 shows a rear view of the inventive configuration.

SPECIFIC DESCRIPTION OF THE PREFERRED EMBODIMENT

Figure 2:
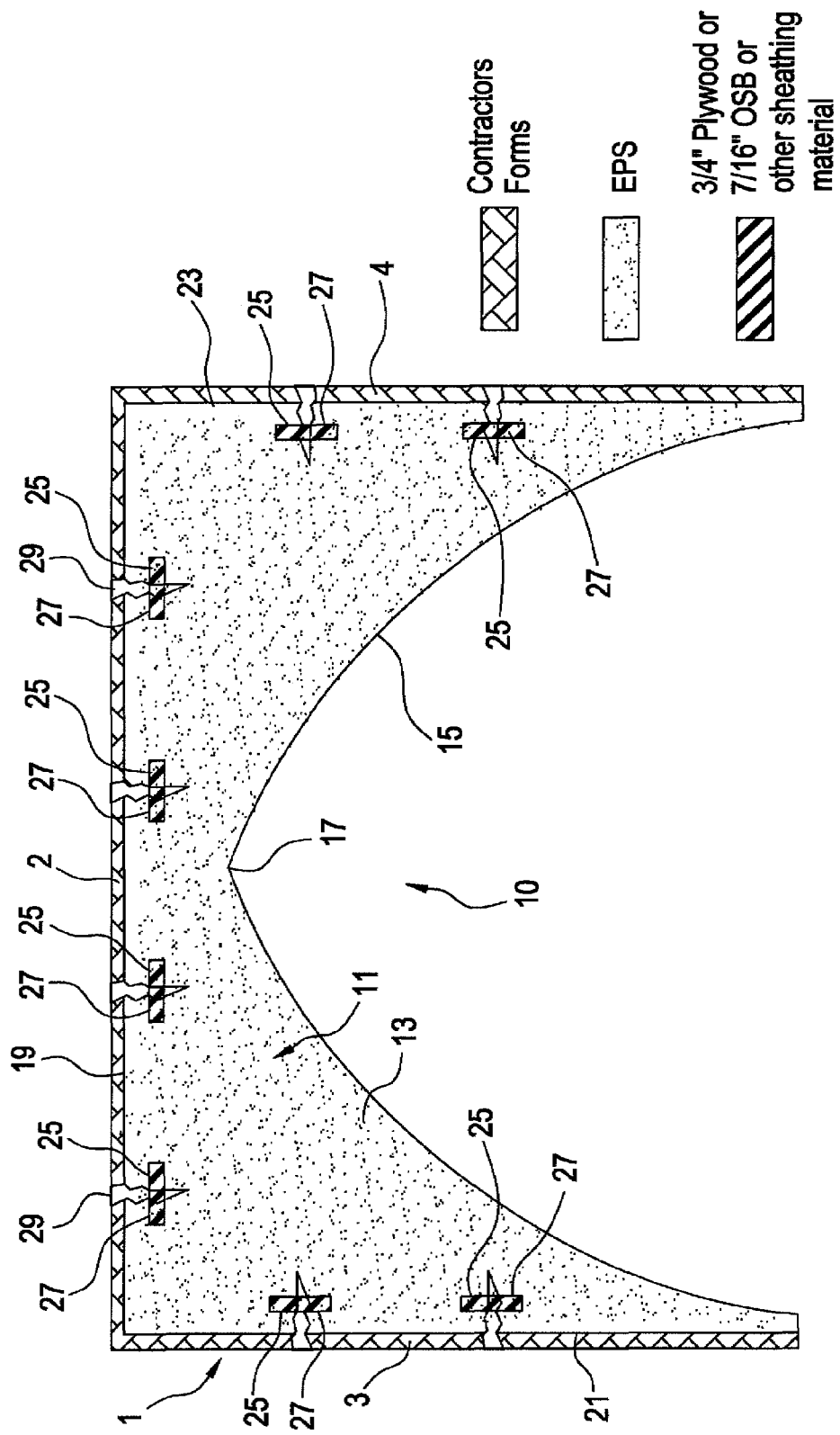
FIG. 2 shows a top view from a similar perspective as in FIG. 1 and depicts the inventive configuration.
Figure 3:
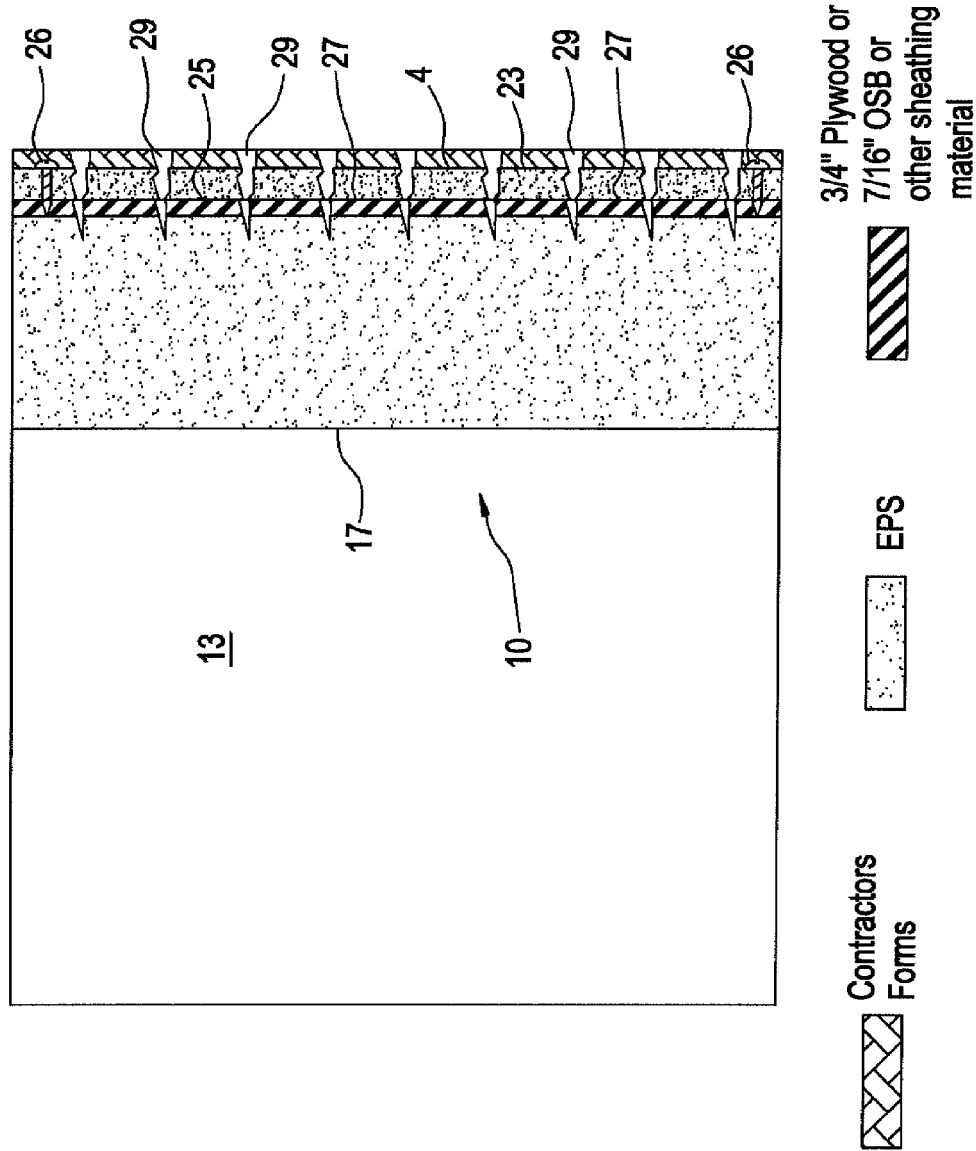
FIG. 3 shows a cross-sectional view through one of the elongated strips extending the height of the inventive form liner.

With reference to FIGS. 2-4, the present invention is generally designated by the reference numeral 10, and is seen to include a form body 11 preferably made of a foam material such as expanded polystyrene (EPS), although other foamable materials suitable for use in the intended environment of the present invention may also be employed.

The form body 11 has inner front surfaces 13 and 15 which are non-linear and converge at a point 17. The shape formed by the inner front surfaces 13 and 15 is designed to provide a form for creation of the end of a bridge support. Such a bridge support may be extremely tall, as tall as 20 or 30 feet or more.

Figure 1:
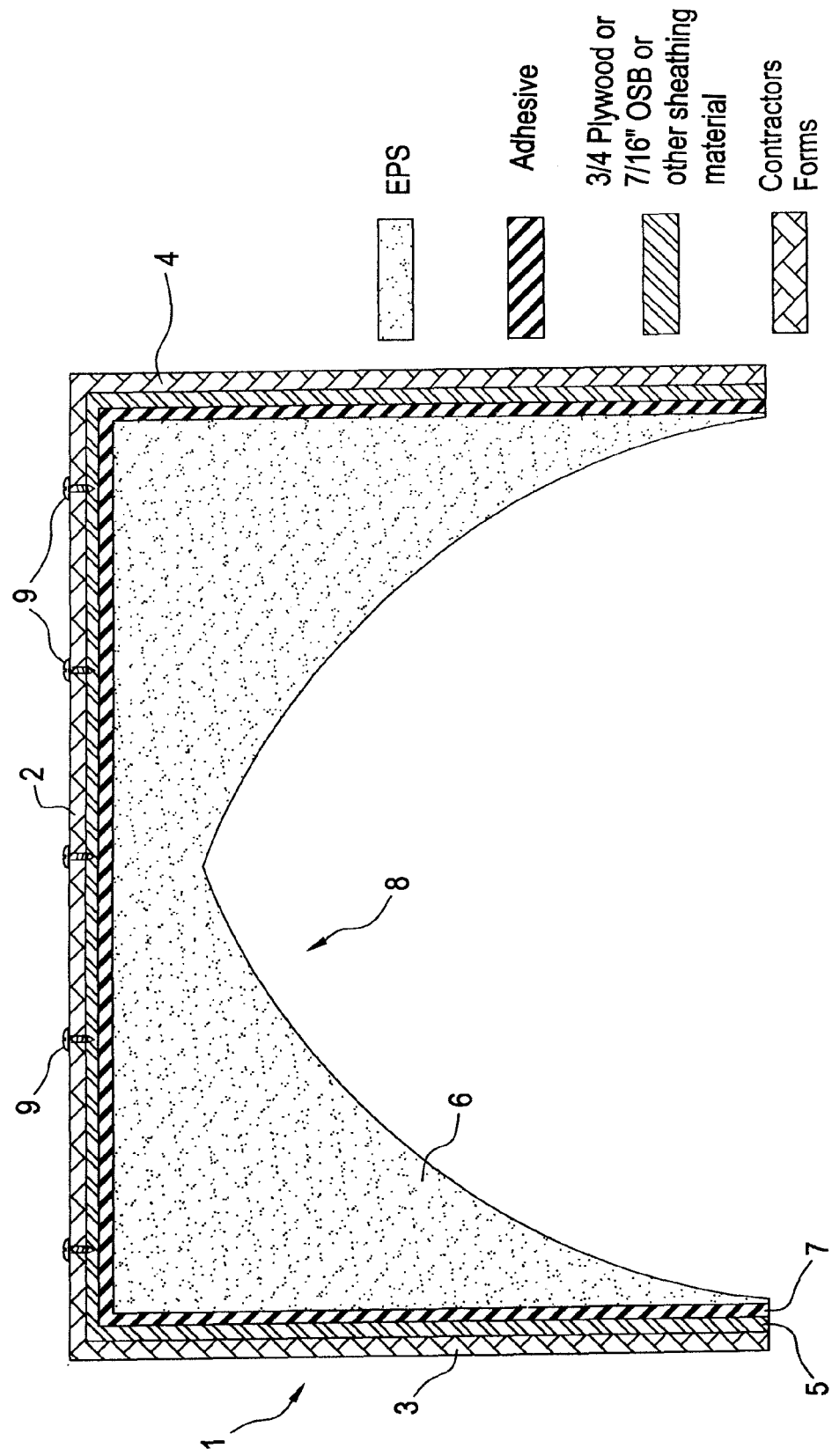
FIG. 1 shows a top view of a prior art configuration.

With further reference to FIG. 2, a contractor form 1 such as shown in FIG. 1 is also seen in FIG. 2 and includes walls 2, 3 and 4 which form a rectangular cross-section. The rear walls 19, 21 and 23 of the EPS form body 11 are sized and configured to match the inner surfaces of the walls 2, 3 and 4 which are known to the fabricator of the inventive device 10 when it is being fabricated.

FIG. 3 shows a side view of the inventive device 10 as well as the wall 4 of the contractor form 1, the wall 13, and the converging area 17 between the walls 13 and 15 (FIG. 1). FIG. 3 shows the height of the wall 4 which corresponds to the height of the wall 23 of the form liner 10. That height as explained earlier can be 20-30 feet or even higher as is necessary to provide a mold which can be used to fabricate a bridge support of any desired height.

With reference back to FIG. 2, as seen from the top view thereof, a multiplicity of slots 25 are formed in body 11 and extend from the top of the body 11 all the way to the bottom thereof. This is also seen with respect to FIG. 3. In the preferred embodiment, the slots 25 have dimensions in the range of ½ inch by 4 inches or ½ inch by 6 inches. The precut strips 27 inserted in the slots may be 7/16 inch thick in the preferred embodiment to facilitate easy sliding into the slots 5.

Inserted within each slot 25 throughout its length is an attaching member comprising an elongated strip 27 of a material such as oriented strand board (OSB) or other suitable material such as plywood, particle board, or the like. The strip 27 is fastened within the slot 25 by any suitable means such as adhesive, screws 26 (FIG. 3), or other attachment means.

As should be understood from FIGS. 2 and 3, when the form liner 10 is inserted within the existing contractor form 1, in accordance with the teachings of the present invention, it is fastened within the contractor form 1 by virtue of screws 29 which are inserted from outside the contractor form 1, through the walls 2, 3 and 4 thereof, into the EPS layer and through the strips 27 contained within the slots 25, to fasten the body 11 within the form 1.

FIG. 3 shows the multiplicity of screws 29 inserted in the manner described above. FIG. 4 shows the screws 29 inserted at spaced intervals from bottom to top as also seen in FIG. 3. Thus, it should be understood that the inventive form liner 10 with its EPS structure having inner surfaces 13 and 15 custom shaped to a desired non-linear shape is easily assembled within the existing contractor form 1 in a manner facilitating its effective securement within the contractor form 1 without need for heavy or cumbersome plywood or other material surround and without the need for any use of adhesives engaging the inner surfaces of the walls 2, 3 and 4 of the form 1 which would be extremely difficult to remove to prepare the contractor form for reuse in another location.

The inventive form liner 10 is easily fabricated, is easily transported to its location of use particularly due to its much lighter weight than is the case with prior art forms that include thick plywood surrounds, is easily assembled to an existing contractor form 1, and easily removed therefrom when the job is completed.

Any suitable materials may be employed for the body 11 of the inventive form liner 10. EPS is preferred but other foamable materials that are able to maintain rigidity when used to mold concrete shapes may suitably be employed. The strips 27 may be made of any suitable material that can receive and mechanically connect to screws or other fasteners. The slots 25 may be formed in the body 11 in any suitable manner, by including forms in the mold for the body 11 allowing the slots 25 to be formed during molding or, after the body 11 has been molded cutting the slots 25 by any suitable means, such as by wire cutting. The screws 29 may be replaced with nails, bolts, or other suitable fasteners so long as they are easily attached and removed.

As such, an invention has been disclosed in terms of a preferred embodiment thereof which fulfills each and every one of the objects of the invention as set forth hereinabove, and provides a new and useful improved form liner for fabricating non-linear shapes of great novelty and utility.

Of course, various changes, modifications and alterations in the teachings of the present invention may be contemplated by those of ordinary skill in the art without departing from the intended spirit and scope of the present invention.

As such, it is intended that the present invention be only limited by the terms of the appended claims.

The invention claimed is:

1. A form liner for molding shapes out of curable materials comprising:
    a) a body made of a foamed molded material, said body having a front surface and a rear wall, said rear wall being configured to conform to a configuration of a front wall of an existing form and said front surface completely comprising said foamed molded material;
    b) a plurality of attaching members comprising elongated strips inserted within said body in respective elongated slots each completely surrounded on all sides by said foamed molded material; and
    c) a plurality of fasteners fastening said body to said existing form, said fasteners extending through said existing form and into said attaching members.

2. The form liner of claim 1, wherein each elongated strip is fastened within an elongated slot with at least one screw.

3. The form liner of claim 1, wherein said front surface is arcuate.

4. The form liner of claim 1, wherein each elongated strip is made of a material chosen from the group consisting of oriented strand board, plywood, steel plate, and metal stud, and said foamed molded material comprises expanded polystyrene.

5. A form for molding shapes out of curable materials comprising:
   a) a body made of a foamed molded material, said body having a front surface and a rear wall, said rear wall being configured to conform to a configuration of a front wall of an existing form and said front surface completely comprising said foamed molded material;
   b) an attaching member inserted within said body in an elongated slot completely surrounded on its sides by said foamed molded material; and
   c) a fastener fastening said body to said existing form, said fastener extending through said existing form and into said attaching member.

6. The form of claim 5, wherein said attaching member comprises an elongated strip.

7. The form of claim 6, wherein said elongated strip comprises a plurality of elongated strips.

8. The form of claim 5, wherein said elongated strip is fastened within said elongated slot.

9. The form of claim 8, wherein said elongated strip is fastened within said elongated slot with at least one screw.

10. The form of claim 7, wherein each elongated strip is received within an elongated slot.

11. The form of claim 10, wherein each elongated strip is fastened within a respective slot.

12. The form of claim 11, wherein each elongated strip is fastened within a respective slot with at least one screw.

13. The form of claim 8, wherein said fastener comprises a screw.

14. The form of claim 13, wherein said fastener comprises a plurality of screws.

15. The form of claim 5, wherein said front surface is arcuate.

16. The form of claim 6, wherein said elongated strip is made of oriented strand board.

17. The form of claim 6, wherein said foamed molded material comprises expanded polystyrene.

18. The form of claim 5, wherein said form comprises said form liner changing an internal shape of said existing form.

* * * * *